United States Patent [19]

Ramsey et al.

[11] Patent Number: 4,879,903
[45] Date of Patent: Nov. 14, 1989

[54] THREE PART LOW COST SENSOR HOUSING

[75] Inventors: Jeffery E. Ramsey, Newark; Janusz Bryzek; Joseph R. Mallon, Jr., both of Fremont, Calif.

[73] Assignee: Nova Sensor, Fremont, Calif.

[21] Appl. No.: 241,030

[22] Filed: Sep. 2, 1988

[51] Int. Cl.[4] .......................... G01L 7/08; G01L 9/06; G01L 19/14
[52] U.S. Cl. ..................... 73/431; 29/621.1; 73/721; 73/756; 73/DIG. 4
[58] Field of Search ............... 73/431, 756, 706, 707, 73/708, 719, 720, 721, 725, 726, 727, 182, 115, DIG. 4; 29/621.1; 361/283

[56] References Cited

U.S. PATENT DOCUMENTS

| | | | |
|---|---|---|---|
| 4,655,088 | 4/1987 | Adams | 73/756 |
| 4,656,454 | 4/1987 | Rosenberger | 338/2 |
| 4,716,492 | 12/1987 | Charboneau et al. | 361/283 |
| 4,732,044 | 3/1988 | Dell'acqua et al. | 73/721 |
| 4,756,193 | 7/1988 | Luettgen | 73/721 |

FOREIGN PATENT DOCUMENTS 3200448  7/1983  Fed. Rep. of Germany ........ 73/727

OTHER PUBLICATIONS

SenSym 1987 Pressure Sensor Handbook, pp. 3-3-3-5 which pertain to LX06XXXG, LX06XXXD, & LX06XXXA Series Temperature Compensated Monolithic Pressure Transducers.

ICSensores Data Sheet entitled "Pressure Sensors Selection Guide Gage-Differential-Absolute Low Cost" (2 pages) no date.

Primary Examiner—Donald O. Woodiel
Attorney, Agent, or Firm—Flehr, Hohbach, Test, Albritton & Herbert

[57] ABSTRACT

A pressure measurement apparatus is provided which comprises: a housing formed from a thermoplastic material and defining a chamber, the housing including an upper wall region and a lower wall region and first and second opposed side-wall regions disposed between the upper and lower wall regions, the upper wall region including first and second vent ports formed therein; a semiconductor pressure transducer mounted within the chamber, the pressure transducer including a first surface in communication with the first vent port and including a second surface in communication with the second vent port; at least one first pin terminal extending through the first side-wall region, the at least one first pin terminal including a short segment within the chamber and an elongated segment outside the chamber; and at least one second pin terminal extending through the second side-wall region, the at least one second pin terminal including a short segment within the chamber and an elongated segment outside the chamber.

40 Claims, 6 Drawing Sheets

THREE PART LOW COST SENSOR HOUSING

BACKGROUND OF THE INVENTION

1. Field of the Invention

The invention relates generally to semiconductor sensors and more particularly to a pressure measurement apparatus including a housing enclosing a semiconductor pressure transducer.

2. Description of the Related Art

Semiconductor pressure transducers ordinarily are enclosed within a housing for protection against contamination. Oppositely facing surfaces of a diaphragm region of a semiconductor differential pressure transducer usually are isolated from each other within a housing to facilitate their exposure to distinct measurand environments for which a pressure difference is to be measured.

For example, one type of earlier semiconductor differential pressure transducer includes a diaphragm having at least one piezoresistor formed in it. A change in the differential pressure applied across oppositely facing surfaces of the diaphragm causes a change in the resistor value of the piezoresistor. The change in resistor value is approximately proportional to the change in differential pressure. Thus, measurement of the resistor value can be used to determine the differential pressure applied across the diaphragm.

In practice, changes in an individual piezoresistor's value can be small and difficult to measure. Therefore, in a typical semiconductor diaphragm, four piezoresistors are formed in a Wheatstone Bridge configuration.

A pressure measurement apparatus of the general type described herein preferably is easily adaptable for use in a wide variety of applications. For example, such an apparatus can be used on a circuit board crowded with other electronic circuits. Thus, it should be compact and easy to use with a standard circuit board. Moreover, physical space limitations frequently can complicate coupling of a pressure measurement apparatus to tubing which communicates with one or more measurand environments. Therefore, the apparatus ought to be easy to couple to such tubing.

While earlier pressure measurement apparati generally have been acceptable, there have been shortcomings with their use. More specifically, earlier apparati generally have not provided the combination of sufficiently compact size plus adequate ease of coupling to tubing providing access to measurand environments. For example, one earlier type of pressure measurement apparatus includes a housing having two vent ports formed in it. The vent ports are formed in opposite sides of the housing. A semiconductor pressure transducer residing within the housing includes a diaphragm region which has two oppositely facing surfaces each exposed to one of the two vent ports. Unfortunately, coupling tubes to vent ports disposed on opposite sides of a housing can be somewhat difficult when the apparatus is connected to a crowded circuit board since the tubes must exit from opposite sides of the PC board.

Another earlier pressure measurement apparatus, while providing two vent ports formed in one side of its housing, suffers from other limitations. Its housing is relatively large and occupies a significant amount of space on a circuit board. Furthermore, the housing is formed from a combination of metallic and ceramic materials. Consequently, it can be relatively expensive to produce and can suffer from mechanical weakness at the juncture of the metallic and ceramic materials.

Pressure measurement apparati of the general type described herein ordinarily have been produced with electrical pin terminals in a Single-In-Line (SIP) configuration. There has been a need for an apparatus which provides pin terminals in a Dual-In-Line (DIP) configuration and which can be readily used in circuit boards utilizing surface mounting techniques.

Thus, there exists a need for a compact and durable pressure measurement apparatus which provides two vent ports in a single side of its housing, and which provides DIP pin terminals which are easily adaptable to surface mounting techniques. The present invention meets these needs.

Furthermore, in view of the wide range of environments in which such a pressure measurement apparatus can be used and the differing space limitations in such environments, it is desirable that the configuration of the vent ports formed in the housing be relatively easy and inexpensive to modify so as to meet specific user requirements. The invention meets this need as well.

SUMMARY OF THE INVENTION

The invention provides a novel pressure measurement apparatus and an associated method to produce it. The apparatus includes a housing formed from a plastic or thermoplastic material. The housing defines a chamber in which a semiconductor pressure transducer resides. First and second vent ports are formed in one side of the housing. The semiconductor pressure transducer within the chamber includes a first surface in communication with the first vent port and a second surface in communication with the second vent port. At least one first pin terminal extends through one side wall region of the housing, and at least one second pin terminal extends through a second side wall region of the housing.

The method of producing the novel pressure measurement apparatus includes the step of providing a lead frame which defines a plurality of open regions. Respective center portions of the housing are molded to the lead frame as an intermediate step. Respective upper housing portions are bonded to the respective center portions so as to provide a plurality of concave vessels. Respective lower housing portions then are bonded to each concave vessel.

The novel pressure measurement apparatus advantageously provides a housing in which two vent ports are formed in one side. The housing is compact and suitable for use in circuit boards designed for DIP circuits. Since the upper and lower housing portions are produced independently from the center housing portion, the configuration of the upper or lower portions can be relatively inexpensively modified by simply changing the shape of the molds in which they are formed. Neither the metal lead frame nor the center portion need be modified. Thus, the new pressure measurement apparatus can be readily adapted to a wide variety of applications in different environments by altering the shapes of its upper or lower housing portions.

These and other features as well as the advantages of the present invention will become more apparent from the following description of an exemplary embodiment thereof, as illustrated in the accompanying drawings.

BRIEF DESCRIPTION OF THE DRAWINGS

The purpose and advantages of the present invention will be apparent to those skilled in the art from the following detailed description in conjunction with the appended drawings in which.

DETAILED DESCRIPTION OF THE PREFERRED EMBODIMENT

The present invention comprises a novel pressure measurement apparatus and an associated method for producing such an apparatus. The following description is presented to enable any person skilled in the art to make and use the invention, and is provided in the context of a particular application and its requirements. Various modifications to the preferred embodiment will be readily apparent to those skilled in the art, and the generic principals defined herein may be applied to other embodiments and applications without departing from the spirit and scope of the invention. Thus, the present invention is not intended to be limited to the embodiment shown, but is to be accorded the widest scope consistent with the principals and features disclosed herein.

Figure 1:
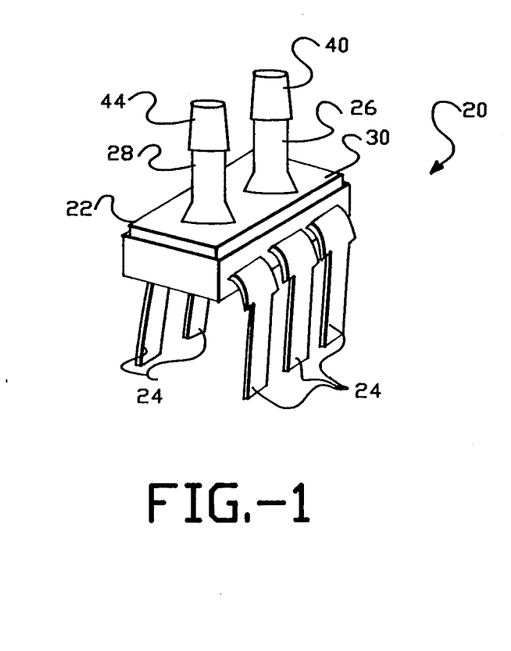
FIG. 1 is an illustrative perspective view of a pressure measurement apparatus in accordance with the invention.
Figure 2:
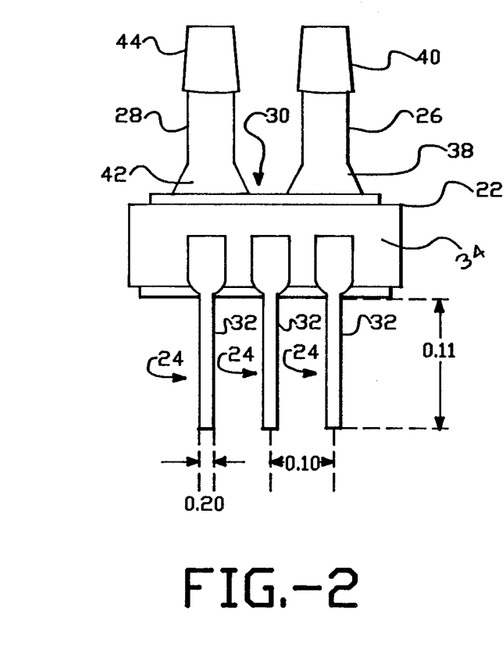
FIG. 2 is a side elevation view of the apparatus of FIG. 1.
Figure 3:
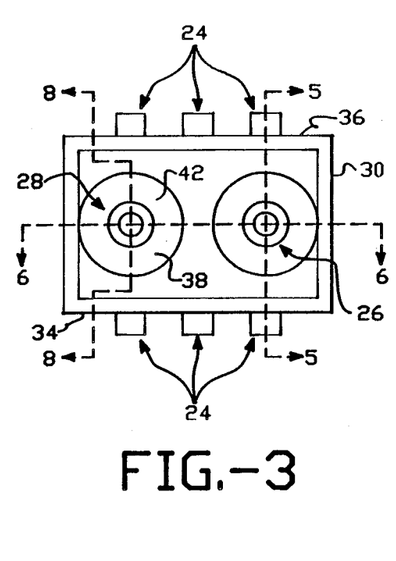
FIG. 3 is a top elevation view of the apparatus of FIG. 1.

FIG. 1 is a perspective view of a pressure measurement apparatus 20 in accordance with the invention. The preferred embodiment includes a generally rectangular housing 22. Six pin terminals 24 extend through the housing as more fully described below. The housing 22 includes first and second external tubes 26 and 28, respectively, extending from an upper wall region 30 of the housing 22.

The housing 22 is formed from a thermoplastic material. As described below, a pressure transducer is disposed within the housing. The pin terminals 24 are electrically coupled to the pressure transducer. The first and second external tubes 26 and 28 define respective conduits which communicate with oppositely-facing first and second surfaces of a diaphragm region of the pressure transducer.

Referring now to FIGS. 1–4, it can be seen that three pin terminals 24 extend from each of two oppositely facing side-wall regions 34 and 36 of the housing 22. The two rows of oppositely extending pin terminals ensure secure mechanical support, for example, when attached to a PC board (not shown). The respective center-line of each respective pin terminal is spaced from the center-line of adjacent pin-terminals by 0.10 inch. Each respective pin terminal 24 includes a respective elongated segment 32 which is approximately 0.020 inch in width, approximately 0.015 inch in thickness and is approximately 0.11 inch in length. Moreover, the total distance spanned by respective pin terminals 24 extending from opposite side-wall regions 34 and 36 of the housing 22 is approximately 0.34 inch. Thus, it will be appreciated that the six pin terminals 24 can readily be integrated into a circuit board designed for DIP circuits.

Figure 4:
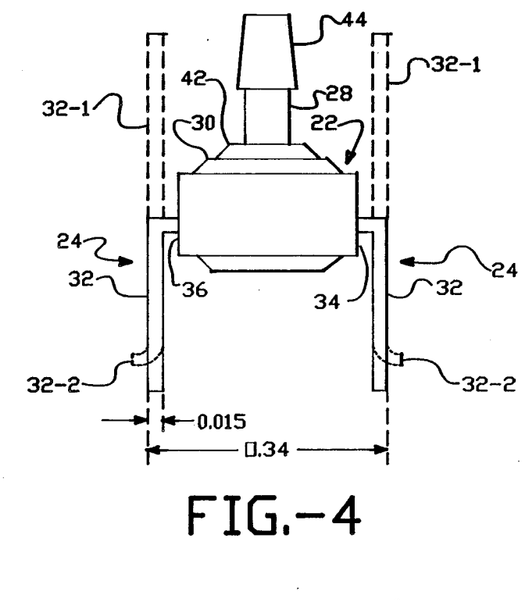
FIG. 4 is an end elevation view of the apparatus of FIG. 1.

Furthermore, as indicated in FIG. 4 by dashed lines 32-1, it will be appreciated that the elongated segments of the pin terminals 24 optionally can be provided such that they extend in the same direction as the respective first and second external tubes 26 and 28. Moreover, as indicated by the dashed lines labelled 32-2 the pin terminals 24 optionally can be provided as in a gull-wing configuration so as to be suitable for surface mounting techniques.

The first and second external tubes 26 and 28 are integrally formed with the upper wall region 30. The first external tube 26 includes an enlarged base region 38 adjacent to the upper wall region 30 and includes a barbed tip region 40 distal from the upper wall region 30. Similarly, the second external tube 28 includes an enlarged base region 42 adjacent to the upper wall region 30 and includes a barbed tip region 48 distal from the upper wall region 30.

During the coupling and decoupling of external tubing (not shown) to and from the respective first and second external tubes 26 and 28, the external tubes can experience mechanical stresses. Since the first and second external tubes 26 and 28 are integrally formed with the upper wall region 30 and include enlarged base regions 38 and 42, they can better withstand such mechanical stresses without sustaining damage. Furthermore, the barbed tip regions 40 and 44 facilitate the provision of a snug interfit between the respective first and second external tubes 26 and 28 and external tubing coupled to them.

Figure 5:
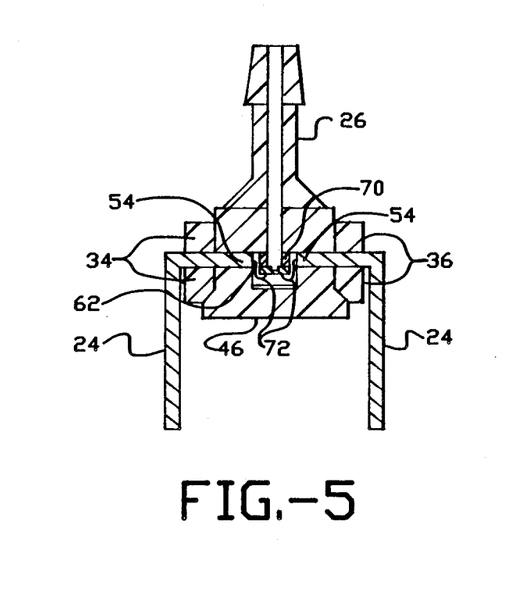
FIG. 5 is a lateral cross section view along line 5—5 of FIG. 3.
Figure 6:
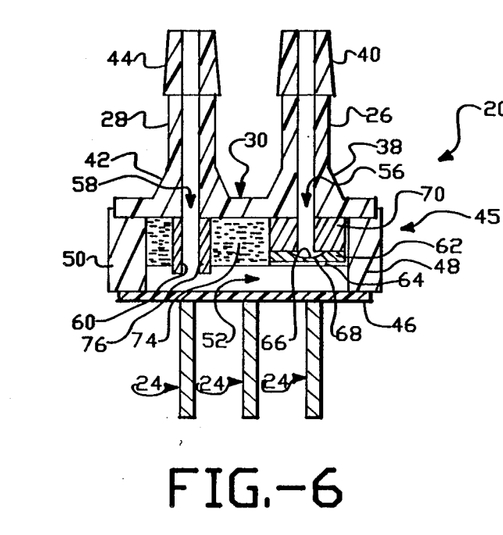
FIG. 6 is a longitudinal cross section view along line 6—6 of FIG. 3.

Referring now to the illustrative drawings of FIGS. 5 and 6, there are shown a lateral cross-sectional view and a longitudinal cross-sectional view of the presently preferred pressure measurement apparatus 20. The apparatus 20 includes an upper wall region 30 and a lower wall region 46. The respective upper and lower wall regions 30 and 46 are disposed on opposite sides of a center portion 45 which includes the respective side wall regions 34 and 36 and respective end wall regions 48 and 50. The upper and lower wall regions 30 and 46 are bonded to the center portion 45, as explained more fully below, so as to define a chamber 52 within the housing 22. The pin terminals 24 extend through the side walls 34 and 36 such that a respective short segment 54 of each respective pin terminal 24 is exposed within the chamber 52.

First and second vent ports 56 and 58 are formed in the upper wall region and communicate with the chamber 52. The first vent port 56 communicates with the external environment through a conduit defined by the first external tube 26. The second vent port 58 communicates with the external environment through a conduit defined by the second external tube 28 and an internal tube 60. The internal tube 60 is integrally formed with the upper wall region 30 and depends into the chamber 52. The internal tube 60 is coaxial with the second external tube 28.

It should be noted that the apparatus of the preferred embodiment is composed of three parts. The center part generally is relatively expensive to tool and is modified only by necessity. On the other hand, the top and bottom parts are readily tooled inexpensively. Thus, alternative custom parts with tubes or vents on either or both parts can be economically built relatively inexpensively with quick turnaround by changing only the top or bottom parts, but not the center part.

A semiconductor differential gage or absolute pressure transducer 62 is disposed within the chamber 52. The transducer 62 includes a diaphragm region 64 having oppositely facing first and second surfaces 66 and 68, respectively. The transducer 62 includes four piezoresistors coupled in a Wheatstone Bridge configuration (not shown). Deflections of the diaphragm region 64 resulting from the exposure of the respective first and second surfaces 66 and 68 to different pressures causes a measurable offset in the Bridge. The formation and operation of the piezoresistors in the Wheatstone Bridge are well known in the art and need not be described in detail herein.

The semiconductor differential pressure transducer 62 is secured to a glass member 70 such that the first surface 66 of the diaphragm region 64 faces toward the glass member, and the second surface 68 faces away from it. The glass member 70 has a hole formed through it which is aligned with and in communication with the first surface 66. The glass member 70 with the pressure transducer 62 mounted thereon is secured within the chamber 52 to the upper wall region 30 such that the hole in the glass member is aligned with the first vent port 56. The glass member 70 is secured to the upper wall region 30 using a room temperature adhesive. The housing 22 and the semiconductor transducer 62 have different coefficients of thermal expansion. The glass member 70 isolates the semiconductor transducer 62 from the housing 22 to protect the transducer 62 from stresses which could result from their different rates of thermal expansion. Thus, the first surface 66 within the chamber 52 is exposed to the external environment through the first vent port 56 via the hole in the glass member 70 and the conduit defined by the first external tube 26.

It should be noted that the main pressure of interest ordinarily is applied (in both gage and differential modes) to the non-circuit side of the semiconductor sensor. This side is usually more resistant to moisture. The preferred embodiment very conveniently makes this application of pressure available by communicating a tube with the non-circuit side of the sensor.

Each of the respective short segments 54 of the respective pin terminals 24 is coupled to the second surface of the pressure transducer 62 by respective electrically conductive cables 72 in a manner which will be understood by those skilled in the art. The cables 72 electrically couple the pin terminals 24 to the Wheatstone Bridge circuit formed on the semiconductor transducer 62 in a manner which will be understood by those skilled in the art and need not be described in detail herein.

The chamber 52 may be partially filled with a gelatinous silicon fill material 74 such as silicon gel. The entire semiconductor pressure transducer 62 and the glass member 70 on which it is mounted are immersed in the fill material 74. The respective cables 72 coupling the transducer 62 to the respective short segments 54 also are immersed in the fill material. A distal portion 76 of the inner tube 60 is not immersed in the fill material 74.

The conduit defined by the respective inner tube 60 and the second external tube 28 provides communication between the external environment and a region of the chamber 52 which is not filled with the gelatinous fill material 74. The fill material 74 protects the pressure transducer 62 and the cables 72 immersed in it from contamination from the external environment. Since it is electrically inert, it does not adversely influence the electrical characteristics of the semiconductor pressure transducer 62.

Thus, the second surface 68 of the transducer 62 is in communication with the external environment through the second vent port 58 via the conduit defined by the second external tube 28 and the internal tube 60. The fill material 74 is mechanically resilient, and therefore, a pressure difference between two distinct external environments to which the first vent port 56 and the second vent port 58 are exposed can cause a deflection of the diaphragm region 64 of the transducer 62. The deflection, in turn, causes a measurable offset in the Bridge which can be monitored through measurement of electrical signals provided on the pin terminals 24.

Consequently, the pressure measurement apparatus 20 of the present invention advantageously provides a housing 22 in which two respective vent ports 56 and 58 are formed in the same side. The housing 22 is relatively compact, and pin terminals 24 extending through the housing are provided in a convenient DIP configuration. Optionally, of course, they can be provided in a configuration suitable for surface mounting techniques. For such an application, the pin terminals are typically bent into a so-called "gull-wing" configuration.

Figure 7:
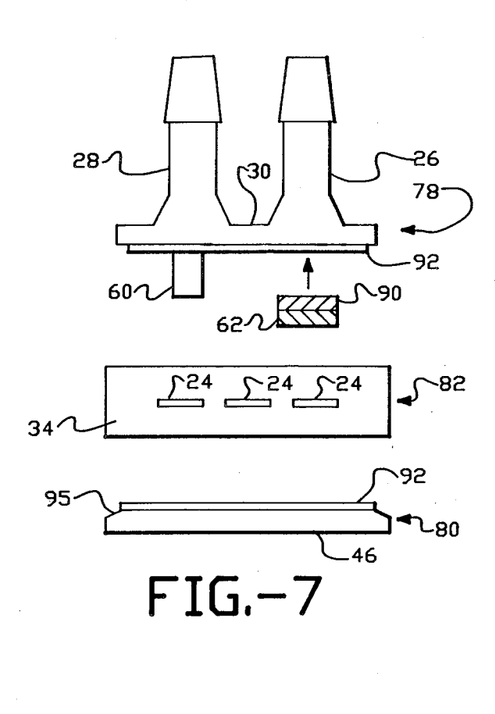
FIG. 7 is an exploded side elevation view of the upper, lower and center portions of the housing of the apparatus of FIG. 1.

The method for assembling the presently preferred pressure measurement apparatus 20 will be explained with reference to FIGS. 7–10. FIG. 7 provides an exploded side elevation view of the housing 22 and the glass-mounted semiconductor transducer within that housing. The housing 22 includes an upper portion 78 which comprises the upper wall region 30 and the respective first and second external tubes 26 and 28. It includes a lower portion 80 which comprises the lower wall region 46. Finally, it includes the center portion 45 which comprises the respective side walls 34 and 36 as well as the respective end walls 48 and 50. The upper portion 78 and the lower portion 80 are bonded to the center portion 45 using sonic welding techniques.

Figure 8:
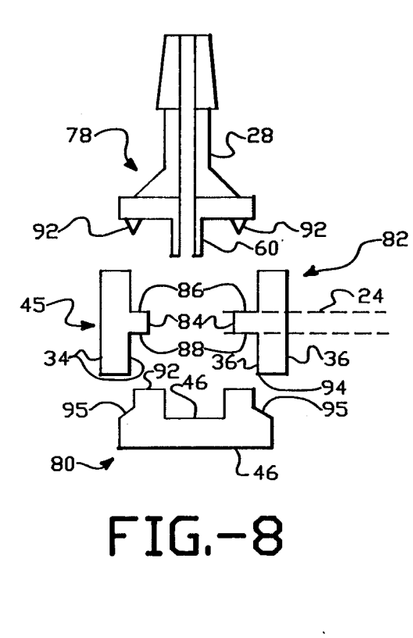
FIG. 8 is an exploded end elevation view of the upper, lower and center portions of the housing of the apparatus of FIG. 1.

FIG. 8 provides an exploded lateral cross-sectional view of the constituents of the housing 22 in order to illustrate details of the sonic welding technique. The center-portion 45 includes the two opposed side walls 34 and 36 through which the pin terminals 24 extend. A protruding inward projecting member 84 extends completely around the interior of the center portion 82 so as to form respective upper and lower shoulder regions 86 and 88 which also extend around the entire interior of the center portion 45. The upper portion 78 includes a ridge 90 which completely surrounds a region of the upper portion 78 which resides within the chamber 52 when the respective upper and center portions 78 and 45 are welded together. The ridge 90 has a triangular cross-sectional shape. It measures approximately six mils on its base and approximately six mils in height.

The upper portion 78 and the center portion 45 are sized such that the upper portion 78 interfits between the side walls 34 and 46 and the end walls 48 and 50 with the ridge 90 resting upon the upper shoulder region 86. The respective upper and center portions 78 and 45 are welded together using well-known sonic techniques. Since the apex of the triangular ridge 90 rests upon the upper shoulder region 86, the upper portion 78 is preferably welded to the center portion 45 using an energy localizer type weld heat staked solvent soldered or affixed by other means such as epoxy or glue in which energy is localized along the apex of the ridge 90.

The lower portion 80 includes an rim 92 which completely surrounds the region of the lower portion 80 which resides within the chamber 52 when the respective lower and center portions 80 and 45 are welded together. The lower and center portions 80 and 45 are sized such that the rim 92 can interfit between the side walls 34 and 36 and the end walls 48 and 50 with the rim 92 disposed adjacent to the lower shoulder region 88. An inner corner region 94 of the side walls 34 and 36 and of the end walls 48 and 50 physically contacts an outer angled region 95 of the lower portion 80 which completely surrounds the exterior base of the rim 92. After the lower portion 80 and the center portion 45 have been fit together as described, the respective lower and center portions 80 and 45 are sonically welded or otherwise attached together as described above such that a shear weld is formed at the junction of the inner corner region 94 outer angled region 95.

Welding together the respective upper, lower and center portions 78, 80 and 45 results in a housing 22 which hermetically sealed except for the two vent ports 56 and 58. In general, a shear weld such as that which bonds the respective lower and center portions 80 and 45 provides a somewhat better seal than an energy localizer weld such as that which bonds the respective upper and center portions 78 and 45. It is significant although not critical that the lower portion 80, which is not immersed in the fill material 74, is bonded to the center portion 45 using a shear weld. The fill material 74 provides some additional hermetic isolation to the region of the chamber 52 adjacent to the energy localizer weld. The region of the chamber 52 adjacent to the shear weld lacks such additional hermetic isolation. The shear weld, therefore, provides a somewhat better weld where it is most needed.

Figure 9:
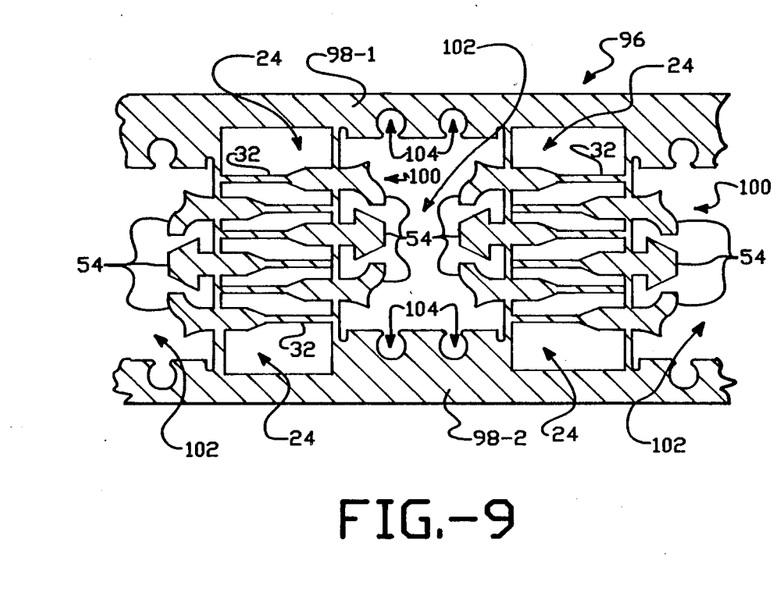
FIG. 9 is a top elevation view of a lead frame used in the production of the apparatus in FIG. 1.

FIG. 9 is an illustrative drawing of a metal lead frame 96 used in the manufacture of the pressure measurement apparatus 20 of the present invention. The lead frame 96 includes elongated parallel side rails 98-1 and 98-2. The side rails 98-1 and 98-2 are coupled together by a plurality of shorting bar pairs 100. Each shorting bar pair 100 includes six interdigitated pin terminals 24. Each pin terminal includes an elongated segment 32 and a short segment 54.

Each shorting bar pair 100 is bounded on either side by a respective open region 102. For each respective shoring bar pair 100, three of the pin terminals 24 include short segments 54 which extend into the open region 102 one side of the respective shorting bar pair 100 and three other respective pin terminals 24 include short segments 54 which extend into another open region 102 on the other side of the respective shorting bar pair 100.

For each respective open region 102, the side rails 98-1 and 98-2 include four respective eyelets 104. Two respective eyelets are formed in side rail 98-1 for each respective open region 102, and two respective eyelets 104 are formed in side rail 98-2 for each respective open region 102.

The lead frame 96, only a portion of which is shown in FIG. 9, is used to produce a plurality of pressure measurement apparati 20. More specifically, referring to FIG. 10, a respective center portion 45 is molded into each respective open region 102 as illustrated. Six respective short segments 54 are exposed within each respective center portion 45. A respective upper shoulder region 86 runs around the inner perimeter of each respective center portion 45. It will be appreciated that a lower shoulder region 88 extends around the entire interior of each respective center portion 45 on the other side thereof which is not visible in FIG. 10. For each respective center portion, the respective side wall regions 34 and 36 and the respective end wall regions 48 and 50 upstand from the upper and lower shoulder regions 86 and 88.

Figure 10:
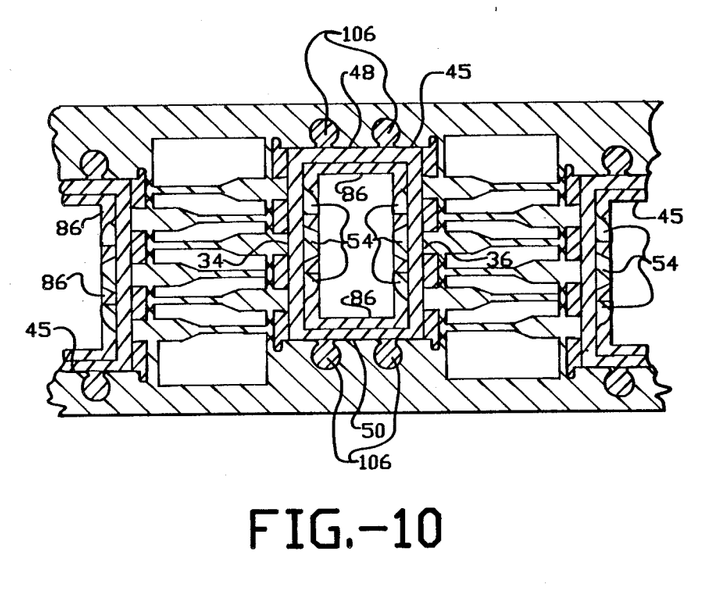
FIG. 10 is a top elevation view of the lead frame of FIG. 9 with center portions molded thereto.

Each respective center portion 45 has two respective integral outward protrusions 106 on each of its end walls 48 and 50. The outward protrusions 106 conform to and fill the respective eyelets 104 which open into each side of the respective open region 102 about which the center portion 45 is formed.

For each respective center portion 45 a respective upper portion 78 has a semiconductor transducer 62 mounted on a glass member 70 installed within it as described above. For each center portion 45, a respective upper portion 78 is welded to the upper shoulder region 86 as described above. The welding of a plurality of center portions 45 to a plurality of upper portions 78 results in a plurality of concave vessels in which the respective concave portions are defined by the upper portions 78.

For each concave vessel, the electrically conductive cables 72 are coupled to the semiconductor pressure transducer 62 as described above. Next, a fill material in liquid form, is introduced into the concave vessels. The fill material is introduced so as to immerse the entire semiconductor transducer, the cables 72 and the short segments 54 exposed within the respective center portion 45. The distal portion 76 of respective inner tubes 60 of the upper portions 78 extends above the liquid fill material 74. The liquid fill material is allowed to cure such that it becomes gelatinous. The fill material may seal slight leaks between pin terminals and the middle part of the side walls.

A lower portion 80 is welded to each concave vessel as described above. Then, the respective pin terminals 24 are electrically isolated from each other and from the lead frame by severing regions of the lead frame 96 between adjacent pin terminals 24 and between the pin terminals and the lead frame 96. In FIG. 10, the regions which are severed are marked by the letter "X".

At this point in the production of the plurality pressure measurement apparati, each individual apparatus is electrically isolated from all others and from the side rails 98-1 and 98-2 and is suspended between the side rails 98-1 and 98-2 due to the interfit between the eyelets 104 and the outward protrusions 106. The individual pressure measurement apparati can be easily tested while still suspended between the side rails. After testing, the side rails 98-1 and 98-2 and the outward protrusions 106 are removed so as to separate the individual pressure measurement apparati. As previously explained, the ability to test in strip-form is very important since one key to economical manufacture of such devices is the ability to handle the devices in such a manner that a high degree of automation is possible from integrated circuit development thru assembly and parametric testing including pressure testing. It will be understood that the pin terminals 24 can be bent in the appropriate direction, either toward or away from the respective first and second external tubes 26 and 28, as desired.

The above-described embodiment and method are merely illustrative of many possible specific embodiments and methods which can represent the principals of the invention. Numerous and varied other arrangements and methods can be readily devised in accordance with these principals without departing from the spirit and scope of of the invention. For example, the shape of the external tubes 26 and 28 can be changed so that they are bent in one direction or another. Alternatively, for example, one or both of the external tubes 26 or 28 could be omitted. Since only the upper portion 78 needs to be modified to incorporate such changes, these changes can be made relatively inexpensively. Furthermore, the nature of the semiconductor pressure transducer can be modified without departing from the features of the invention directed to protecting such transducer. For example, a capacitive pressure transducer could be employed.

Furthermore, for example, although a particular and very useful configuration of the device has been described as the preferred embodiment, many other configurations are possible. Alternate geometries can be readily conceived including geometries with ports on opposite sides, geometries useful for absolute, gage, sealed or differential pressure measurement configuration for accellerometers or microstructures such as microvalves are readily conceived, designed and fabricated. Thus, the inventors have conceived a device which can readily be reconfigured while maintaining the advantages of mass production offered by the leadframe approach. While the preferred embodiment includes three plastic portions, upper, lower, and middle, devices including a different number of separate plastic portions can be provided without departing from the scope of the invention.

Thus, the foregoing description is not intended to limit the invention which defined by the appended claims in which:

What is claimed is:

1. A sensor apparatus comprising:
   a housing formed from a thermoplastic material and defining a chamber, said housing including an upper wall region and a lower wall region and first and second opposed side-wall regions disposed between said upper and lower wall regions, said upper wall region including first and second vent ports formed therein;
   a semiconductor electricalmechanical sensor means mounted within the chamber, said sensor means including a first surface in communication with the first vent port and including a second surface in communication with the second vent port;
   at least one first pin terminal extending through said first side-wall region, said at least one first pin terminal including a short segment within the chamber and an elongated segment outside the chamber; and
   at least one second pin terminal extending through said second side-wall region, said at least one second pin terminal including a short segment within the chamber and an elongated segment outside the chamber.

2. The apparatus of claim 1 including:
   at least three respective first pin terminals extending through said first side-wall region, each respective first pin terminal including a respective short segment within the chamber and a respective elongated segment outside the chamber; and
   at least three respective second pin terminals extending through said second side-wall region, each respective second pin terminal including a respective short segment within the chamber and a respective elongated segment outside the chamber.

3. The apparatus of claim 1 wherein said housing includes an internal tube within the chamber in integral communication with the second vent port.

4. The apparatus of claim 1:
   wherein said housing is formed from an upper portion including said upper wall region, a center portion including said first and second opposed side-wall regions and a lower portion including said lower wall region; and
   wherein said center portion is disposed between said upper and lower portions and is hermetically bonded to said upper and lower portions.

5. The apparatus of claim 4 wherein said upper portion includes an internal conduit which extends within the chamber and is in communication with the second vent port.

6. The apparatus of claim 5:
   wherein said sensor means is secured to said upper portion such that said sensor means depends within the chamber; and
   wherein said internal conduit includes a distal portion which is disposed deeper within the chamber than is said sensor means.

7. The apparatus of claim 6 and further comprising:
   an inert gelatinous fill material partially filling the chamber such that said sensor means is immersed in said fill material and such that said distal portion of said internal conduit is not immersed in said fill material;
   whereby a non-filled region of the chamber is in communication with the second vent port.

8. The apparatus of claim 7:
   wherein said internal conduit includes an internal tube integral to said upper portion and depending within the chamber; and
   wherein said distal portion comprises a tip of said internal tube.

9. The apparatus of claim 7 and further comprising:
   first coupling means for electrically coupling said sensor means to said short segment of said at least one first pin terminal; and
   second coupling means for electrically coupling said sensor means to said short segment of said at least one second pin terminal;
   wherein said first and second coupling means are immersed in said fill material.

10. The apparatus of claim 1 wherein said housing includes an integral first external tube in communication with the first vent port.

11. The apparatus of claim 10 wherein said first external tube has increased thickness adjacent to the first vent port.

12. The apparatus of claim 10 wherein said first external tube has a barbed tip distal from the first vent port.

13. The apparatus of claim 1 wherein said housing includes an integral second external tube in communication with the second vent port.

14. The apparatus of claim 13 wherein said second external tube has increased thickness adjacent to the second vent port.

15. The apparatus of claim 13 wherein said second external tube has a barbed tip distal from the second vent port.

16. The apparatus of claim 1 and further comprising:
a glass member bonded to said housing within the chamber, said glass member having a hole formed therein, the hole being aligned with the first vent port;
wherein said sensor means comprises a semiconductor element including said first and second surfaces, said semiconductor element being bonded to said glass member such that said first surface is in communication with the first vent port through the hole.

17. A sensor apparatus comprising:
a housing formed from a thermoplastic material and defining a chamber;
wherein said housing includes an upper portion including an upper wall region having first and second vent ports formed therein, a center portion including first and second opposed side-wall regions and a lower portion including a lower wall region;
wherein said center portion is disposed between said upper and lower portions and is hermetically bonded to said upper and lower portions;
wherein said upper portion includes an integral first external tube in communication with the first vent port and includes an integral second external tube in communication with the second vent port;
a glass member bonded to said housing within the chamber, said glass member having a hole formed therein, the hole being aligned with the first vent port;
a semiconductor electromechanical sensor means including a semiconductor element including first and second surfaces, said semiconductor element being bonded to said glass member such that said first surface is in communication with the first vent port through the hole;
wherein said upper portion includes an internal conduit which extends within the chamber and is in communication with the second vent port, said internal conduit including a distal portion which is disposed deeper within the chamber than is said pressure transducer means;
at least three respect first pin terminals extending through said first side-wall region, each respective first pin terminal including a respective short segment within the chamber and a respective elongated segment outside the chamber;
at least three respective second pin terminals extending through said second side-wall region, each respective second pin terminal including a respective short segment within the chamber and a respective elongated segment outside the chamber;
first coupling means for electrically coupling said semiconductor element to said respective short segments of said respective first pin terminals;
second coupling means for electrically coupling said semiconductor element to said respective short segments of said respective second pin terminals; and
an inert gelatinous fill material partially filling the chamber such that said semiconductor element and said first and second coupling means are immersed in said fill material and such that said distal portion of said internal conduit is not immersed in said fill material;
whereby a non-filled region of the chamber is in communication with the second vent port.

18. A method for producing a plurality of sensor apparati comprising the steps of:
providing a lead frame including two elongated parallel side rails connected together by a plurality of respective shorting bar pairs, each respective shorting bar pair including at least six respective interdigitated pin terminals, each respective shorting bar pair being spaced from adjacent shorting bar pairs by respective open regions on either side, each respective pin terminal of a respective shorting bar pair including a respective short segment extending into one of the respective open regions adjacent to the respective shorting bar pair, each respective side rail including at least one respective eyelet in communication with each respective open region such that each respective open region is bounded by respective opposed eyelets;
for each respective open region, forming a respective center portion from a thermoplastic material, such that each respective center portion includes respective first and second opposed side-walls and respective first and second opposed end walls, each opposed end-wall including an integral outward protrusion extending therefrom, such that each respective center portion lines a corresponding open region and upstands from said lead frame so as to surround said corresponding open region, such that respective short segments extending into said corresponding open region remain exposed, and such that respective outward protrusions of respective opposed end walls are seated within opposed eyelets bounding a corresponding open region;
forming a plurality of respective upper portions from a thermoplastic material, each respective upper portion including respective first and second vent ports;
providing a semiconductor electromechanical sensor means including first and second surfaces;
bonding each respective upper portion to each respective center portion to form a plurality of respective concave vessels;
forming a plurality of respective lower portions from a thermoplastic material;
bonding each respective lower portion to a respective center portion; and
severing said respective shorting bars such that each respective center section includes a least three pin terminals extending from a respective first side wall and at least three pin terminals extending from a respective second side wall, and such that each pin terminal is electrically isolated from each and every other pin terminal and such that each pin terminal is electrically isolated from said side rails;
whereby for each respective open region an electrically isolated pressure measurement apparatus is suspended between said side rails.

19. The method of claim 18 wherein said step of bonding each respective upper portion to each respective center portion includes sonic welding.

20. The method of claim 18 or 19 wherein said step of bonding each respective lower portion to each respective center portion includes sonic welding.

21. The method of claim 18 wherein each respective upper portion includes a respective internal circuit in communication with a respective second vent port and upstanding within said respective upper portion; and further comprising the step of securing a respective sensor means to each respective upper portion such that a respective first surface of the respective sensor means is in communication with a respective first vent port and such that for each respective upper portion, a respective internal conduit protrudes deeper within said respective upper portion than does said respective pressure transducer means.

22. The method of claim 21 and further comprising the step of introducing an inert fill material into each respective concave vessel such that each respective pressure transducer means is immersed in the fill material and each respective internal conduit protrudes from the fill material.

23. The method of claim 22 and further comprising the step of curing the fill material.

24. The method of claim 18 and further including the step of severing the side rails from the plurality of respective pressure measurement apparati.

25. The method of claim 18 and further comprising the step of:
for each respective concave vessel, electrically coupling the second surface of a respective sensor means secured therein to each respective short segment extending into the respective concave vessel.

26. The method of a claim 18 and further comprising the step of bending said pin terminals in a single direction.

27. A pressure measurement apparatus produced according to a method comprising the steps of:
providing a lead frame including two elongated parallel side rails connected together by a plurality of respective shorting bar pairs, each respective shorting bar pair including at least six respective interdigitated pin terminals, each respective shorting bar pair being spaced from adjacent shorting bar pairs by respective open regions on either side, each respective pin terminal of a respective shorting bar pair including a respective short segment extending into one of the respective open regions adjacent to the respective shorting bar pair, each respective side rail including at least one respective eyelet in communication with each respective open region such that each respective open region is bounded by respective opposed eyelets;
for each respective open region, forming a respective center portion from a thermoplastic material, such that each respective center portion includes respective first and second opposed side-walls and respective first and second opposed end walls, each opposed end-wall including an integral outward protrusion extending therefrom, such that each respective center portion lines a corresponding open region and upstands from said lead frame so as to surround said corresponding open region, such that respective short segments extending into said corresponding open region remain exposed, and such that respective outward protrusions of respective opposed end walls are seated within opposed eyelets bounding a corresponding open region;
forming a plurality of respective upper portions from a thermoplastic material, each respective upper portion including respective first and second vent ports;
providing a semiconductor electromechanical sensor means including first and second surfaces;
bonding each respective upper portion to each respective center portion to form a plurality of respective concave vessels;
forming a plurality of respective lower portions from a thermoplastic material;
bonding each respective lower portion to a respective center portion; and
severing said respective shorting bars such that each respective center section includes at least three pin terminals extending from a respective first side wall and at least three pin terminals extending from a respective second side wall, and such that each pin terminal is electrically isolated from each and every other pin terminal and such that each pin terminal is electrically isolated from said side rails;
whereby for each respective open region an electrically isolated pressure measurement apparatus is suspended between said side rails.

28. The apparatus of claim 27 wherein said step of bonding each respective upper portion to each respective center portion includes sonic welding.

29. The apparatus of claim 27 or 28 wherein said step of bonding each respective lower portion to each respective center portion includes sonic welding.

30. The apparatus of claim 27 wherein each respective upper portion includes a respective internal conduit in communication with a respective second vent port and upstanding within said respective upper portion; and further comprising the step of securing a respective sensor means to each respective upper portion such that a respective first surface of the respective sensor means is in communication with a respective first vent port and such that for each respective upper portion, a respective internal conduit protrudes deeper within said respective upper portion than does said respective pressure transducer means.

31. The apparatus of claim 30 and further comprising the step of introducing an inert fill material into each respective concave vessel such that each respective pressure transducer means is immersed in the fill material and each respective internal conduit protrudes from the fill material.

32. The apparatus of claim 31 and further comprising the step of curing the fill material.

33. The apparatus of claim 27 and further including the step of severing the side rails from the plurality of respective pressure measurement apparati.

34. The apparatus of claim 27 and further comprising the step of:
for each respective concave vessel, electrically coupling the second surface of a respective sensor means secured therein to each respective short segment extending into the respective concave vessel.

35. The apparatus of claim 27 and further comprising the step of bending said pin terminals in a single direction.

36. A sensor comprising:

a housing formed from a thermoplastic material and defining a chamber;

wherein said housing includes an upper wall portion and a lower wall portion and a side-wall portion;

wherein said side-wall portion is disposed between said upper and lower wall portions and includes first and second opposed side-walls;

wherein said upper wall portion, said side-wall portion and said lower wall portion are bonded together so as to define the chamber;

semiconductor electromechanical sensor means mounted within the chamber;

at least one first pin terminal extending through said first side-wall portion, said at least one first pin terminal including a short segment within the chamber and an elongated segment outside the chamber.

37. The sensor of claim 36 wherein:

said upper wall portion includes at leat one vent port formed therein; and said sensor means includes a first surface in communication with the at least one port.

38. The sensor of claim 37 and further comprising:

at least one second pin terminal extending through said second side-wall portion, said at least one second pin terminal including a short segment within the chamber and an elongated segment outside the chamber.

39. The sensor of claim 36 wherein:

said upper wall portion includes first and second vent ports formed therein; and said sensor means includes a first surface in communication with the first vent port and includes a second surface in communication with the second vent port.

40. The sensor of claim 39 and further comprising:

at least one second pin terminal extending through said second side-wall portion, said at least one second pin terminal including a short segment within the chamber and an elongated segment outside the chamber.

* * * * *